Figure 3:
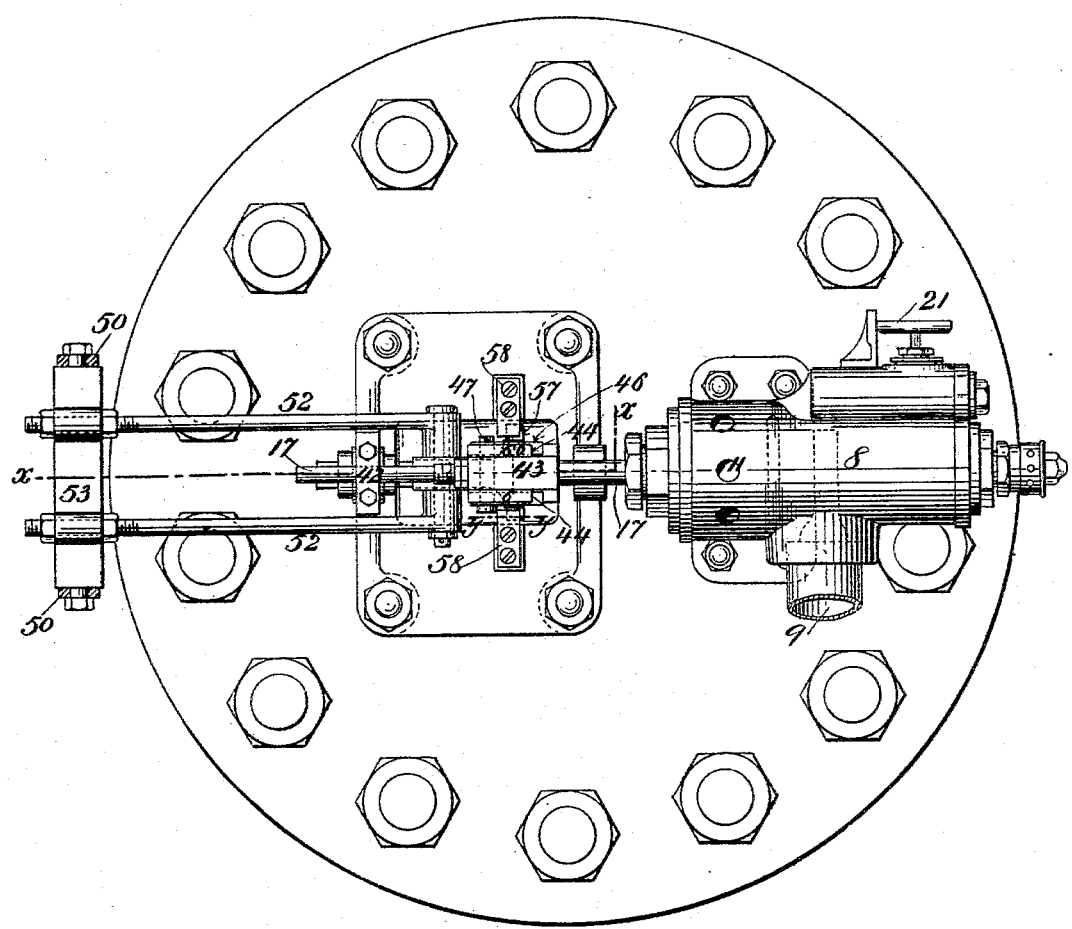

(No Model.) 4 Sheets—Sheet 1.
J. RAPIEFF.
AUXILIARY VALVE FOR PNEUMATIC GUNS.
No. 490,125. Fig. 1. Patented Jan. 17, 1893.
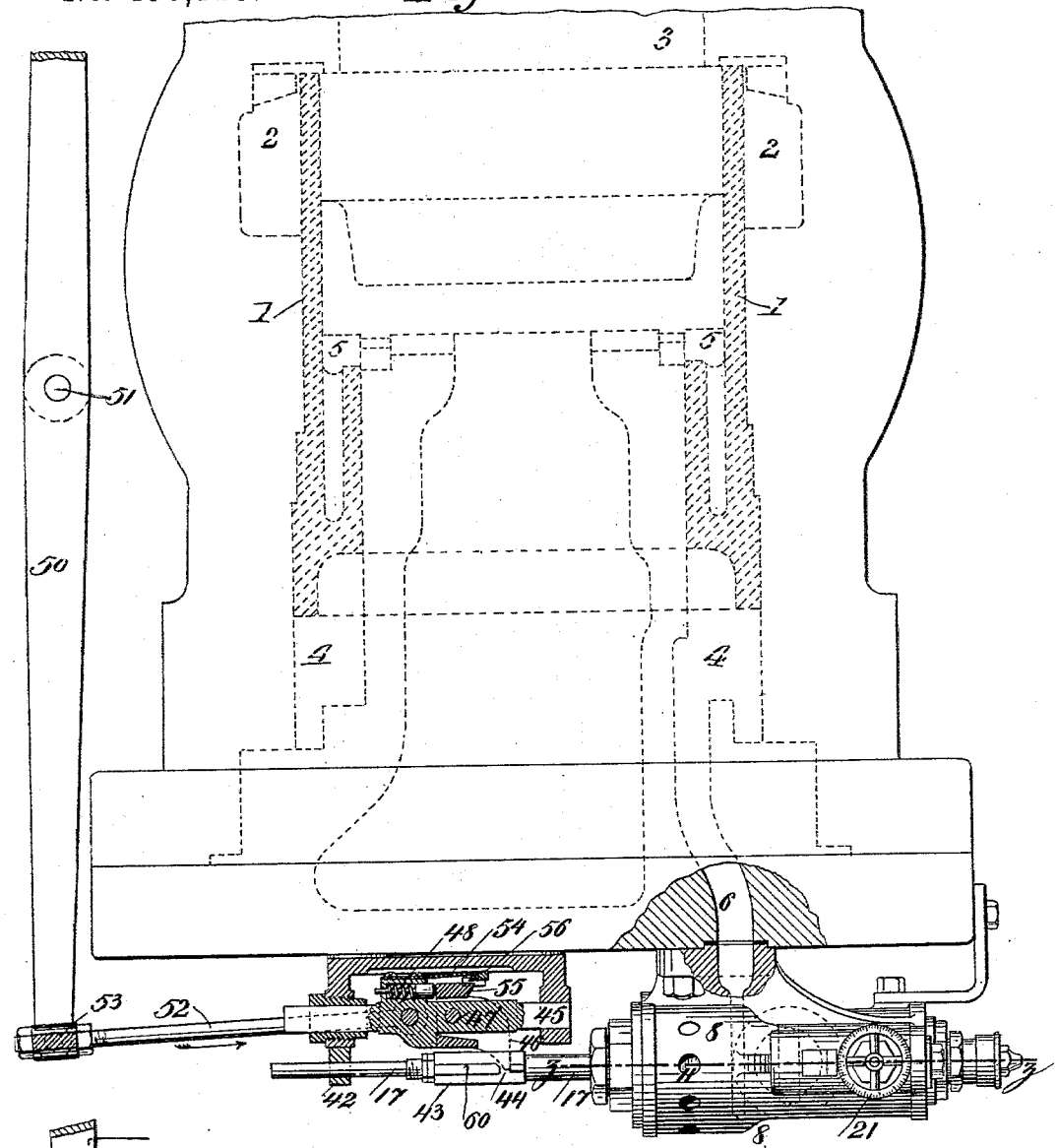
Fig. 2.
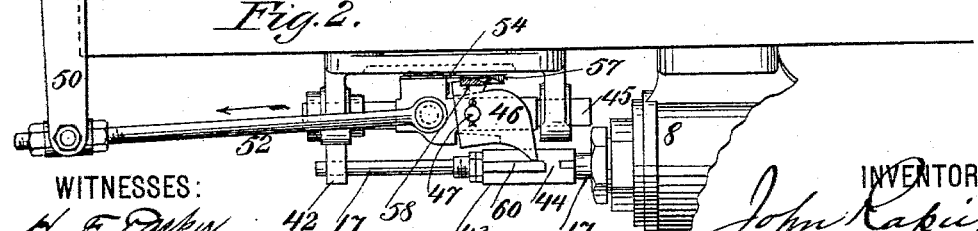
WITNESSES:
H. F. Parker.
Chas. Hanimann
INVENTOR
John Rapieff
BY
Chas. W. Forbes
ATTORNEY
THE NORRIS PETERS CO., PHOTO-LITHO., WASHINGTON, D. C.

(No Model.) 4 Sheets—Sheet 2.
J. RAPIEFF.
AUXILIARY VALVE FOR PNEUMATIC GUNS.

No. 490,125. Patented Jan. 17, 1893.

WITNESSES:

INVENTOR
John Rapieff
BY
Chas. W. Forbes
ATTORNEY

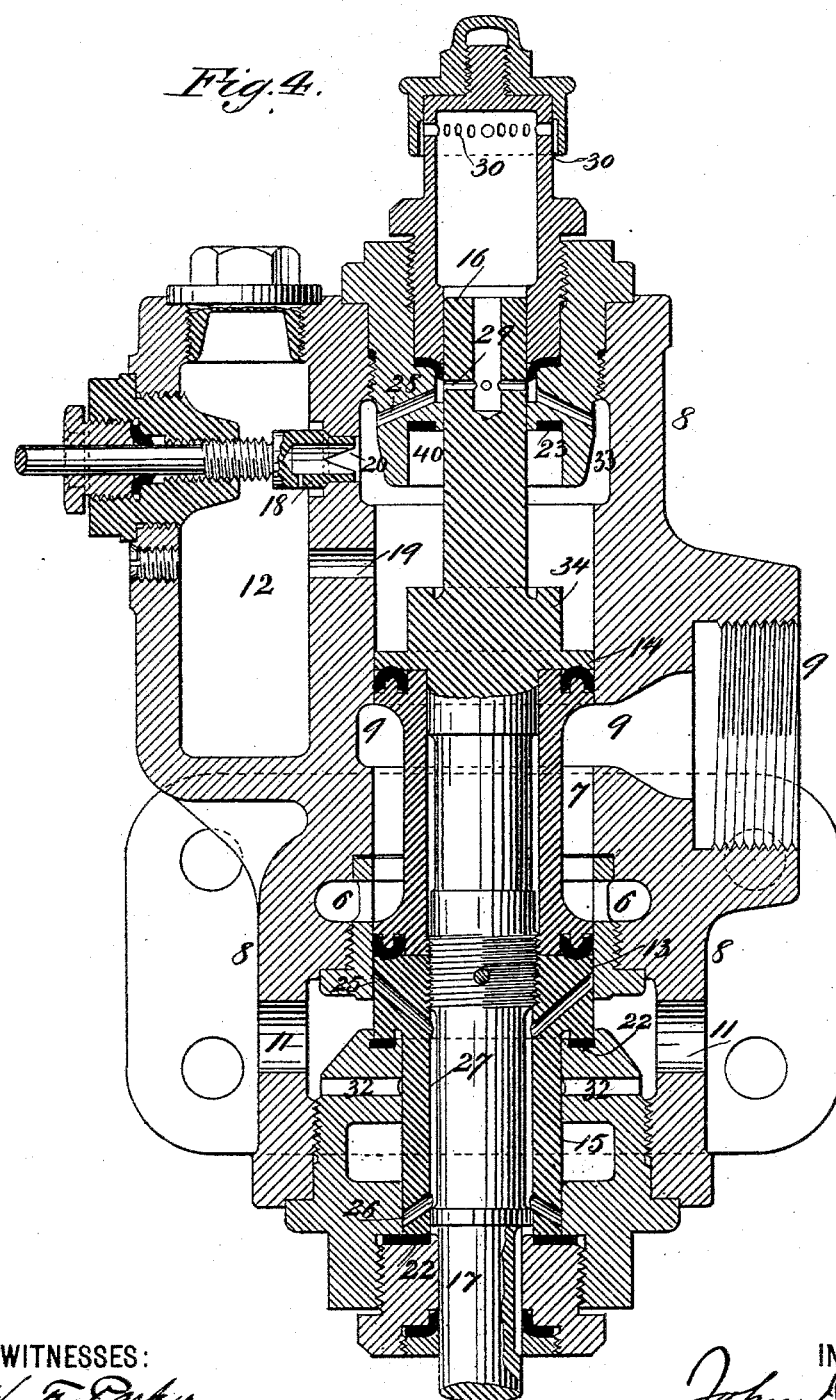

(No Model.) 4 Sheets—Sheet 4.
J. RAPIEFF.
AUXILIARY VALVE FOR PNEUMATIC GUNS.
No. 490,125. Patented Jan. 17, 1893.
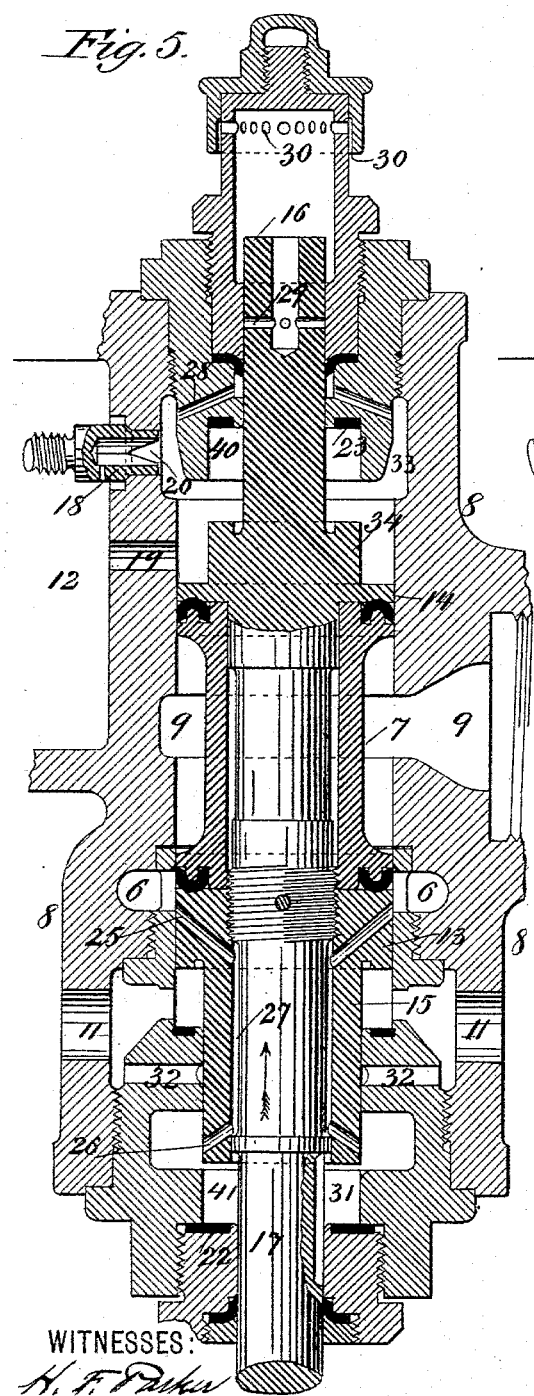
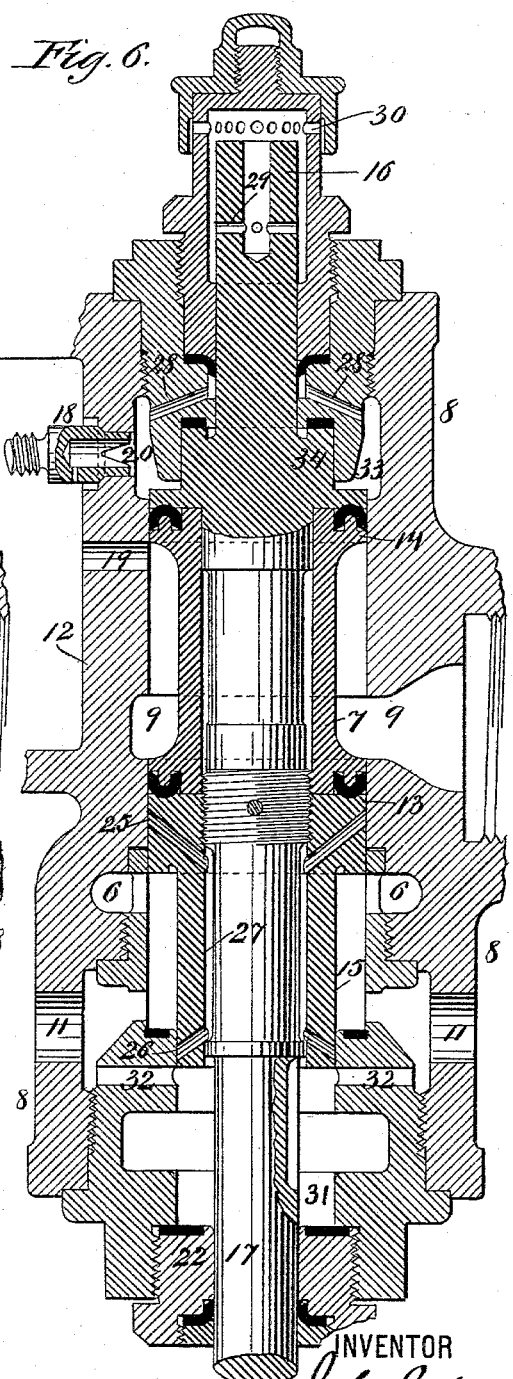
WITNESSES:
INVENTOR

UNITED STATES PATENT OFFICE.

JOHN RAPIEFF, OF NEW YORK, N. Y.

AUXILIARY VALVE FOR PNEUMATIC GUNS.

SPECIFICATION forming part of Letters Patent No. 490,125, dated January 17, 1893.

Application filed November 29, 1889. Renewed June 11, 1892. Serial No. 436,310. (No model.)

*To all whom it may concern:*

Be it known that I, JOHN RAPIEFF, a subject of the Emperor of Russia, residing in the city, county, and State of New York, have invented certain new and useful Improvements in Auxiliary Valves for Pneumatic Guns, of which the following is a specification, reference being had to the accompanying drawings, in which—

Figure 1, is a side elevation of the firing valve casing of a pneumatic gun, showing the auxilary valve and its accessories attached, being partly in section on the line $x—x$, Fig. 3; Fig. 2, a detail side elevation of a portion of the mechanism, being partly in section at the line $y—y$, Fig. 3; Fig. 3, an inverted plan view of Fig. 1; Fig. 4, an enlarged sectional elevation of the auxiliary valve taken in the plane of the line $z—z$, Fig. 1; and Figs. 5 and 6, similar views showing different positions of the auxiliary valve.

My invention relates to pneumatic delivery valves actuated by pressure of the compressed fluid which they control, and in which the valve is maintained on its seat by the pressure applied to a predominating area on the back of the valve as opposed to the same pressure applied to a lesser area at the opposite or opening end of the valve; and my invention is especially applicable to such valves as used in pneumatic ordnance to perform the act of firing.

My invention consists of an improved pressure actuated auxiliary valve for exhausting and restoring the retaining pressure at the back of the delivery or "firing" valve; and the object of my improvement is to insure the accuracy of the opening, dwelling, and closing periods of the firing valve and the corresponding accuracy of the range of the projectile which is dependent upon the volume of compressed air or other gas delivered.

In the present illustration, the firing valve 1, is of the annular type; its outline as would appear in cross-section being indicated by dotted lines in Fig. 1.

2, is the annular port surrounding the valve 1, connecting with the storage reservoir.

3, is the port connecting to the gun barrel.

4, is the chamber at the back of the annular valve within which the retaining pressure is charged or exhausted.

5, is the chamber to which opening pressure is applied constantly to the opposite lesser area of the valve 1.

6, is the charging and exhausting port of the chamber 4, and which the auxiliary valve 7, in casing 8, controls.

I will first refer to the construction and operation of the auxilary valve as shown in Figs. 4, 5 and 6, and subsequently describe one form of mechanical device by which the gunner may conveniently impart the initial movement of the auxiliary valve, which is necessary before the pressure becomes operative thereon to perform the remainder of the movements automatically.

In the auxiliary valve case 8, 6, is the port corresponding to that in Fig. 1, connecting to the firing valve.

9, is the supply port connected by a pipe to the storage reservoirs.

11, are the exhaust ports or perforations through the casing.

12, is a receiving chamber exteriorly closed.

The valve 7, is composed of double pistons 13, 14, of equal diameter, and a plunger 15, of lesser diameter; also a supplemental plunger 16, at its opposite end.

17, is the valve rod, for imparting the initial movement of the valve in the direction of the arrow.

The construction of the separable parts of the valve casing being clearly illustrated, will be understood by an inspection of the figures, as also the location and function of the several packings which are indicated by the blackened portion of the drawings, and will not therefore require a detailed description.

The packings 22, and 23, serve to cushion the valve at either termination of stroke.

25, is a series of passages connecting through the space 27, to the passages 26, in the valve plunger.

The receiving chamber 12, connects to the valve cylinder through the port 19, and also to the extremity of the cylinder through the port 20. The port 20, is provided with a throttling or cramping valve 18, which is adjusted by a screw threaded stem worked by an exterior indexed hand wheel 21, Figs. 1, and 3, so as to give the throttle valve a determinable amount of opening. Such amount of opening determines the range of the projectile as will hereinafter appear.

Fig. 4 illustrates the auxiliary valve in its normal position; the pressure from port 9, being applied between the pistons, balancing the same and connecting with the port 6, to the firing valve. The chamber 12, and the extremity of the cylinder to which it connects are normally free from pressure; the said cylinder connecting through passages 28, 29, and 30, to the atmosphere.

The advancement of the valve to produce the act of firing, is performed by the gunner to the extent illustrated by Fig. 5, wherein the margin of the piston 13, cuts off the firing valve port 6, and the passages 25, 26, immediately thereafter connect the back pressure from the firing valve with the chamber 31. Subsequent to this period, the movements are automatic until the normal position of the valve is restored. The pressure admitted to chamber 31, now exerts itself on the plunger 15, driving the valve quickly to the extremity of its stroke as in Fig. 6. In this position, the port 6, is discharged through the exhaust ports 11, giving full openings to the firing valve. The pressure in chamber 31, is instantly discharged through openings 32, and 11. The receiving chamber 12, is instantly charged through port 19, from the interior of the pistons having constant connection with the supply pipe. The extremity of the cylinder at 33, is closed by the supplemental plunger 16. The compressed air in chamber 12, now issues into the chamber 33, at a given rate of flow through the throttled port 20, returning the valve 7, in a measured time to its normal position restoring the pressure to the firing valve instantly closing it by restoration of pressure from port 9, to port 6. The pressure in chamber 12, and space 33, that has driven the valve 7, back is now exhausted through passages 29, brought opposite the passages 28, preparatory to the succeeding operation of firing. It will be seen therefore that the arbitrary timing of the automatic return movement of the auxiliary valve which is predetermined by the adjustment of the throttle 18, will give corresponding time to the open dwell of the firing valve. The opening, and closing, movements of the firing valve being practically instantaneous the duration of the dwell determines the volume of firing fluid delivered to the gun and the corresponding range of the projectile for a given angle of elevation.

The sockets 40, and 41, into which the plunger parts 34, and 15, of the valve 7, fit, act as air cushioning chambers to relieve the valve of shock.

In Figs. 1, 2, and 3, the valve stem 17, has an outer bearing at 42, to guide it. 43, is a block notched at 44. 45, is a sliding bar bearing a pawl 46, which straddles it and is pivoted thereon at 47. 48, is a spring and stud bearing on the heel of the pawl to thrust it into the notches 44. 50, is a firing lever, being double, and is fulcrumed at 51, having a suitable connection to the gunner's hand lever. The connecting rods 52, connect from the swiveled bar 53, to the head of the sliding bar 45, carrying the pawl with it. 54, is a flat steel spring upon the head of the sliding bar, having a spur 56, that engages with the spur 55, of the pawl, when the latter is thrown up. 57, 57, are lateral projections to the spur of the spring that are beveled as shown in Fig. 2, to engage with the stationary beveled trippers 58, on the return movement of the sliding bar 45, as indicated by arrow Fig. 2.

In operation, the firing lever is moved, advancing the sliding bar and valve stem from the position of Fig. 1, to a position at which the auxiliary valve is first actuated by pressure, as in Fig. 5, at which period the valve stem is carried away from the pawl 46, by the pressure agent as hereinbefore described, and the parallel surface 60, upon which the pawl rides elevates it sufficiently to engage with the spring spur 56. The retained elevated position of the pawl permits the immediate return movement of the valve stem 17, by the fluid motive agent without engaging with or injuring the pawl or its mechanism. As the lever 50, is retired to its normal position by hand (or by a spring or weight) the pawl is released from its elevated position by the trippers 58, re-engaging with the notch 44, preparatory to the next firing operation.

It is to be understood that the present invention is not confined to the specific hand operated valve starting mechanism shown, whereas such mechanism may be variously devised; for instance in such form as I have described in a separate patent application, filed simultaneously herewith, embracing a pneumatic valve starting device.

What I claim herein as my invention, and desire to secure by Letters Patent is:

1. The combination with a pressure actuated fluid delivery valve, of an auxiliary double piston valve having the space between its pistons permanently connected with the pressure source, a port of the delivery-valve-retaining pressure-chamber connected with the said space between the pistons when the auxiliary valve is normal, a receiving chamber, a port thereof opening into the piston cylinder connected with the said space between the pistons when the valve is advanced to the extremity of its stroke, a port of regulated capacity connecting from the receiving chamber to the piston cylinder at a portion thereof beyond the range of advance movement of the pistons, and an exhaust outlet at the opposite end of the piston cylinder exterior to the pistons, to which outlet the said delivery valve port is connected when the pistons are advanced.

2. The combination in an auxiliary valve adapted for the purposes described, of double connected pistons, a supply port permanently connected to the space between them, a delivery-valve-retaining pressure port connected with the space between the pistons when the same are in a normal position, exhaust openings with which the said delivery valve port is connected when the pistons are advanced, a plunger 16 on the opening end of the piston valve, and a chamber thereof connected with the said delivery valve port, by passages 25, 26, through the pistons, subsequent to an initial opening movement and antecedent to connection of said delivery valve port with said exhaust, for the purposes specified.

3. The combination in an auxiliary valve adapted for the purposes described, of double connected pistons, a supply port permanently connected to the space between them, an exhaust port at one end of the piston cylinder, a delivery-valve-retaining pressure port therein, intermediate to the said supply and exhaust ports, being alternately connective to the same respectively, according as the pistons are in a normal or an advanced position, a receiving chamber a port thereof opening into the piston cylinder connected with the said space between the pistons when the valve is advanced to the extremity of its stroke, a port of regulated capacity connecting from the receiving chamber to the piston cylinder at the end thereof opposite the exhaust end, and a supplemental plunger extending through the head of the valve casing at the end of the cylinder therein, to which the said receiving chamber connects, and exhaust passages, 19, in said plunger connected thereby with the receiving chamber when the valve is normal, for the purposes set forth.

4. The combination, in an auxiliary valve adapted for the purposes described, of a cylinder, both ends of which are normally exhausted, double connected pistons therein which are balanced, having equal area, and between which a pressure supply port is constantly connected, a plunger extension and pressure chamber thereof whereby an opening movement is imparted to the pistons, a delivery-valve-retaining pressure port located in the cylinder to connect between the pistons when the same are normal, but to connect with an exhausted end of the cylinder when the pistons receive said opening movement, a receiving chamber normally exhausted, a port thereof located in the cylinder to connect with the inter-space of the pistons at or near the terminating point of said opening movement, a port of the receiving chamber of regulated capacity located in the end of the cylinder toward which the said opening movement occurs, and a supplemental plunger operative on exhaust passages for closing the receiving chamber and adjacent end of the cylinder during such opening movement.

5. The combination with an auxiliary valve partly operative by pressure, of a hand operated starting mechanism for imparting the initial movement to the valve, consisting of a notched valve rod, a lever actuated pawl 46 engaging with the notch on the valve rod in the direction of such initial movement, a second pawl 56 moving with the first pawl engaging with a notch or spur thereon to hold it when it is thrown out of the valve rod notch by the continued movement of the valve beyond that imparted by hand, in the manner described and a stationary tripper 58 whereby the second pawl is tripped from the first pawl during the retracting stroke of the latter.

JOHN RAPIEFF.

Witnesses:
CHAS. W. FORBES,
CHAS. HANIMANN.